(12) United States Patent
Ghezel-Ayagh et al.

(10) Patent No.: US 6,365,290 B1
(45) Date of Patent: Apr. 2, 2002

(54) HIGH-EFFICIENCY FUEL CELL SYSTEM

(75) Inventors: Hossein Ghezel-Ayagh; Anthony John Leo, both of New Milford; Robert A. Sanderson, Wethersfield, all of CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/453,185

(22) Filed: Dec. 2, 1999

(51) Int. Cl.$^7$ .......................... H01M 8/00; H01M 8/04; H01M 8/18; H01M 8/12
(52) U.S. Cl. .............................. 429/20; 429/13; 429/17; 429/26
(58) Field of Search .............................. 429/13, 17, 20, 429/26

(56) References Cited

U.S. PATENT DOCUMENTS 5,678,647 A * 10/1997 Wolfe et al. ................ 180/65.3
5,968,680 A * 10/1999 Wolfe et al. .................... 429/13

OTHER PUBLICATIONS

G. Steinfeld, H. Maru and R.A. Sanderson, "High Efficiency Carbonate Fuel Cell/Turbine Hybrid Power Cycles", Second Workshop on Very High Efficiency Fuel Cell/Advanced Turbine Power Cycles, Proceedings of the Fuel Cell 1996 Review.

M.C. Williams, L.E. Parsons and P. Micheli, "Engineering a 70 percent Efficient Indirect–Fired Fuel Cell Bottomed Turbine Cycle", Proceedings 9th Fuel Cell Contractor's Meeting, Poster 10, pp. 121–129 (1995).

G. Steinfeld, H. Maru and R.A. Sanderson, "High Efficiency Direct Fuel Cell Hybrid Power Cycles for Near Term Application", Fuel Cell Seminar, Orlando, Florida, pp. 454–457 (1996).

G. Steinfeld, H. Maru and R.A. Sanderson, "High Efficiency Carbonate Fuel Cell/Turbine Hybrid Power Cycles", 31st IECEC Conference, Washington, D.C. (1996).

G. Steinfeld, "High Efficiency Carbonate Fuel Cell/Turbine Power Cycles", Proceedings of the Workshop on Very High Efficiency Fuel Cell/Advanced Turbine Power Cycles, U.S. DOE/METC, Morgantown, WV (1995).

* cited by examiner

Primary Examiner—Stephen Kalafut
Assistant Examiner—Julian A. Mercado
(74) Attorney, Agent, or Firm—Robin, Blecker & Daley

(57) ABSTRACT

A hybrid fuel cell system in which a fuel cell and a heat engine are employed. Waste heat from the fuel cell is used to fire the heat engine cycle and the system is configured such that a high temperature fuel cell and conventional heat exchange equipment can be used in the system. Additionally the configuration allows independent operation of the fuel cell and the heat engine.

8 Claims, 1 Drawing Sheet

HIGH-EFFICIENCY FUEL CELL SYSTEM

BACKGROUND OF THE INVENTION

This invention relates to fuel cell systems and, in particular, to fuel cell systems having high efficiency.

There have been attempts recently by designers of fuel cell systems to develop high efficiency systems by combining the fuel cell with a turbine generator. These so-called hybrid systems typically situate the fuel cell in the position normally occupied by the combustor of the turbine generator. Air is compressed by the turbine generator compressor section, heated and then sent to the fuel cell cathode section. The anode section of the fuel cell, in turn, is supplied with pressurized fuel.

With this configuration, both the fuel cell and the turbine generator produce electricity. More particularly, the fuel cell operating at pressure electrochemically converts the pressurized fuel and oxidant gases to produce electricity and pressurized flue gas. The latter gas is then expanded in the turbine generator expansion section to produce more electricity.

The above hybrid system while providing efficiencies also has a number of disadvantages. One disadvantage is that the fuel cell is operated at pressure. For high temperature fuel cells this substantially increases the cost of the power plant hardware. It also inhibits the use of internal reforming in the fuel cell. This further increases the plant cost and reduces efficiency. Finally, it subjects the fuel cell to potentially damaging pressure differentials in the event of plant upset.

Another disadvantage is that the turbine generator must operate within the pressure limits of the fuel cell. This pressure range may not result in the most efficient pressure ratio for the turbine. A further disadvantage is that the fuel cell cannot be operated without the turbine generator and the turbine generator cannot be operated without the fuel cell. This total dependence of the fuel cell and the turbine generator on each other decreases the reliability of the system.

Another hybrid system has been proposed in which the fuel is supplied at ambient temperature allowing the use of an internal reforming or direct fuel cell. In this system waste heat from the fuel is transferred to a fired turbine generator (Brayton) cycle.

More particularly, anode exhaust from the anode section of the fuel cell and a portion (50 percent) of the low pressure oxidant gas developed by the expansion section of the turbine generator are burned in a burner. The output oxidant gas from the burner is at a high temperature (2,000 degrees F.) and is passed through a heat exchanger adapted to operate at the high temperature. The cooled gas at a lower intermediate temperature (1,250 degrees F.) from the heat exchanger is then carried by a blower and combined with the other portion (50 percent) of the oxidant gas developed by the expansion section of the turbine generator. The combined gas at a low pressure (15 psia) is then input to the to cathode section of the fuel cell.

In the aforesaid system, the compressor section of the turbine compresses air to a high pressure (360 psia) and the resultant pressurized gas is then fed to the high temperature heat exchanger and heated to a high temperature. The heated and compressed air stream is burned in another burner with a small portion of the fuel gas (5 percent) and the burner output (at 2,000 degrees F.) is sent through the expansion section of the gas turbine. This results in cooler (720 degrees F.), decompressed, but still pressurized, output oxidant gas which is used, as above-described, to develop the oxidant gas for the fuel cell cathode section.

Also, in the above system, the exhaust from the cathode section of the fuel cell is fed to a heat recovery steam generator. The latter generator recovers heat from the gas stream to develop steam which is fed to a steam turbine.

As can be appreciated, the aforesaid system requires the use a very high temperature heat exchanger which has yet to be fully developed. This coupled with the complexity of the system, i.e., its use of blowers, recycle streams and two turbines, reduces the attractiveness of the system as a commercially viable hybrid system.

It is therefore an object of the present invention to provide a fuel cell system of the above-mentioned hybrid type which avoids the disadvantages of the prior systems.

It is a further object of the present invention to provide a fuel cell system of the hybrid type which is less complex and more efficient than prior systems.

It is yet a further object of the present invention to provide a fuel cell system of the hybrid type which realizes the aforementioned objectives and permits the use of a high temperature fuel cell.

SUMMARY OF THE INVENTION

In accordance with the principles of the present invention the above and other objectives are realized in a fuel cell system in which a high temperature fuel cell having anode and cathode sections and a heat engine having compressor and expansion cycles are employed. More particularly, in accord with the invention a heat recovery unit receives fuel and water from respective fuel and water supplies, and also cathode exhaust gases from the cathode section of the fuel cell. The output stream from the heat recovery unit contains heated fuel and serves as the fuel supply for the anode section of the fuel cell.

The heat recovery unit also acts as a heat exchanger for the pressurized oxidant gas supplied from the compressor cycle of the heat engine which receives air. The heated pressurized oxidant gas is passed through a heat exchanger where it is further heated before being acted on by the expansion cycle of the heat engine. In this cycle, the gas is expanded to a low pressure and fed to an oxidizer which also receives the exhaust from the anode section of the fuel cell.

The output gas of the oxidizer is passed through the heat exchanger and gives up heat to the pressurized gas passing therethrough from the compressor cycle of the heat engine. The cooled gas is then fed into the cathode section of the fuel cell as the cathode supply gas.

With this configuration of the hybrid system, the complexity of the system is significantly reduced. At the same time, heat exchange operations can be performed at temperatures for which conventional equipment is available. Also, pressurization of the fuel gas is not needed and oxidant gas is supplied at pressurization resulting form the heat engine only. These and other advantages of the system will be discussed in more detail hereinbelow.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
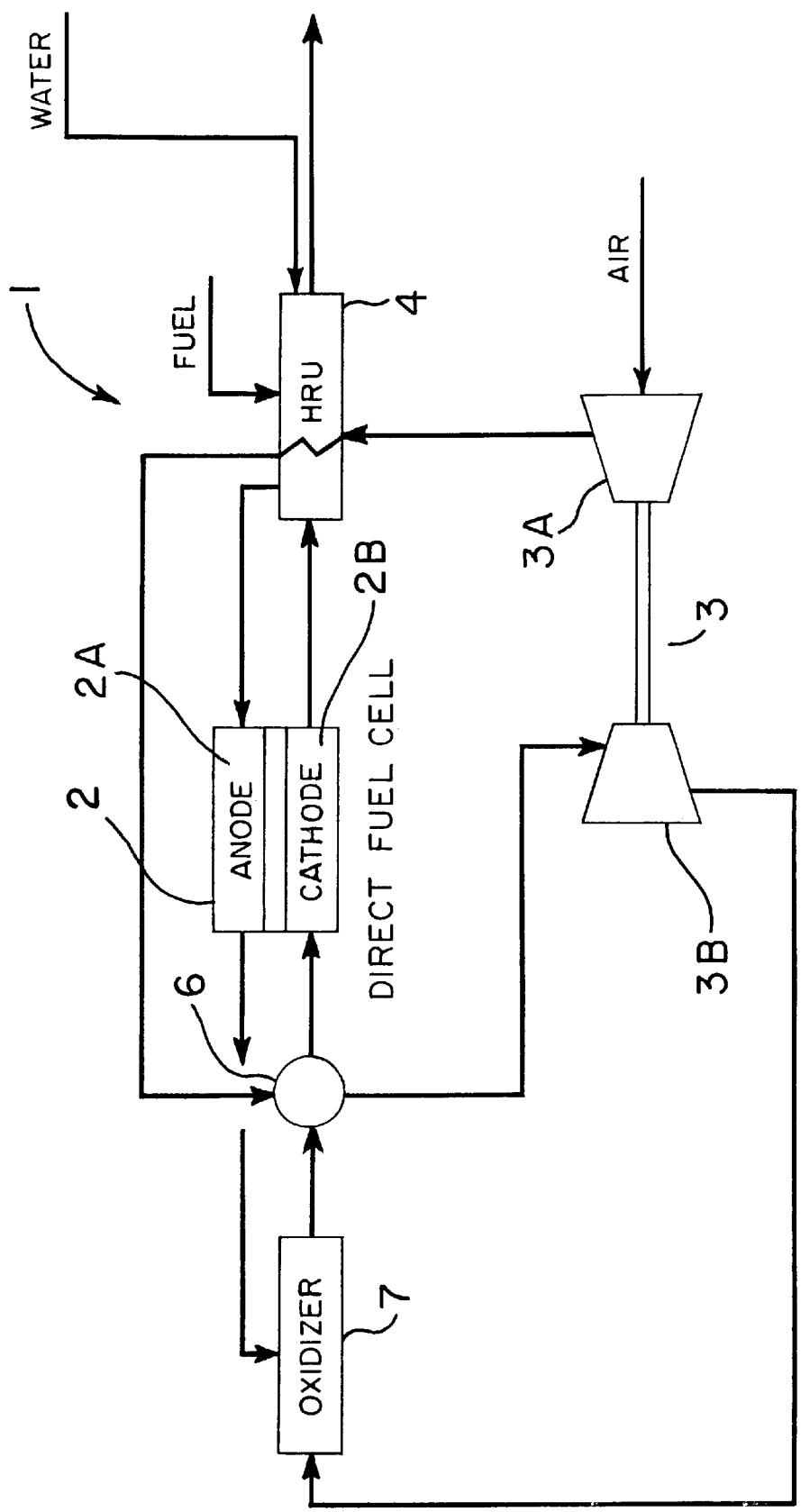
FIG. 1 shows a fuel cell system of the hybrid type in accordance with the principles of the present invention.

FIG. 1 shows a hybrid fuel cell system 1 in accordance with the principles of the present invention. The system 1 includes a high temperature fuel cell 2 having an anode section 2A and a cathode section 2B. As shown, the high temperature fuel cell 2 is an internally reforming or direct carbonate fuel cell. However, an externally reforming carbonate fuel cell can also be employed. Additionally, other types of high temperature fuel cells such as, for example, internally or externally reforming solid oxide fuel cells, can be used.

The hybrid system 1 also includes a heat engine 3, shown illustratively as a turbine generator, having a gas compressor section 3A for carrying out a gas compression cycle and a gas decompression or expansion section 3B for carrying out a gas expansion cycle. A typical heat engine might be an appropriately sized gas turbine with provision for removal of compressed gas or reintroduction of gas to the expansion section. Other heat engines, such as a Sterling cycle engine, might also be employed.

A heat recovery unit 4 receives fuel and water from respective fuel and water supplies (not shown). The fuel is delivered at near ambient pressure. Also delivered to the heat recovery unit 4 is heated (approximately 1150 to 1200 degrees F.) exhaust gas from the cathode section 2B of the fuel cell 2. This gas includes unspent oxidant gas as well as products of combustion (i.e, carbon dioxide and water).

In the heat recovery unit 4, the water is heated to the point of producing steam, while the fuel is heated to a temperature suitable for entry into the fuel cell anode section (900–1000 degrees F.). The steam and the heated fuel are then fed as the input stream for the fuel cell anode section 2A. In this section of the fuel cell, the fuel and steam are internally reformed to produce hydrogen gas for the fuel cell 2.

The heat recovery unit 4 also acts as a heat exchanger for the oxidant to be supplied to the fuel cell cathode section 2B. Air introduced into the compressor section 3A of the heat engine 3 is pressurized (up to 250 psia) and passed through the heat recovery unit 4 and heated (1000 to 1100 degrees F.). The heated air is then conveyed to a further heat exchanger 6 and further heated (to 1500 to 1600 degrees F.). The heated pressurized oxidant is then passed through the expansion section 3B of the heat engine 3 where it is expanded to a low pressure (approximately 15.5 psia).

The expanded gas is then fed to an oxidizer 7 which also receives the exhaust gas from the anode section 2A of the fuel cell 2. The exhaust gas contains unspent oxidant and products of combustion (i.e, carbon dioxide and water). The output stream from the oxidizer is cooled (1000–1100 degrees F.) by passage through the heat exchanger 6 to a temperature suitable for entry as oxidant gas to the cathode section 2B of the fuel cell 2.

As can be appreciated, the hybrid system 1 is a simplified system for realizing high efficiency in a system utilizing a high temperature fuel cell 2. The system utilizes near ambient pressure for the anode fuel stream and relatively low pressure for the cathode gas stream, the latter being achieved solely through action of the heat engine 3. Also, the heat exchanger temperature has been placed at a temperature in the range of conventional high temperature heat exchange equipment.

The heat engine cycle is unfired and is achieved by using waste heat from the fuel cell. This yields the highest efficiency, since all primary fuel consumption is in the fuel cell 2, which is the more efficient component of the system. Also, as above-noted, gas recycle blowers are not used because cathode and anode recycle is not needed. Gas supply is accomplished with the normal gas pressure for fuel and the compressor section of the heat engine for air. The supplied fuel gas does not need to be pressurized more than approximately 15 psia, which is advantageous for power plant systems located away from pressurized gas lines. Since the fuel cell gas does not need to be supplied at high pressure, the fuel can include a wide range of fuels that are delivered near ambient pressure. Typical fuels might be landfill gas, biomass gas and natural gas in a distribution system.

High efficiency is also achieved without the use of an additional steam bottoming cycle. This eliminates the need for a high pressure boiler and as well as concerns relative to unattended operation of same.

Finally, the fuel system 2 and the turbine generator 3 are sufficiently independent of one another to allow one to operate without the other. This allows the turbine pressure ratio to be set independently of the fuel pressure considerations. This makes the hybrid system more adaptable and more reliable.

A system analysis has been carried out on the hybrid system 1 using certain commercial product assumptions (i.e., a plant sized at 20 MW, an internally reforming carbonate fuel cell, and an axial gas turbine), resulting in the following operating characteristics projected for the system:
Fuel Cell:
  DC Power: 17.62 MW
  AC Power Gross: 17.21 MW
  AC Power, Net: 17.00 MW
Turbine
  Compressor Power: 5.84 MW
  Expander Output: 9.32 MW
  Net Output: 3.48 MW
Total Plant Output: 20.41 MW
Overall LHV Efficiency: 71.07%

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. Thus, for example, while the heat engine 3 is shown as an unfired turbine generator, a burner could be provided in the turbine (or in an indirectly fired configuration) to allow independent operation of the turbine. This could be used to replace the usual startup burner for the fuel cell. The heat engine may also be used to load follow- utilizing stored kinetic energy- while the fuel cell is operated at constant power. This is possible due to the decoupled configuration of the fuel cell and heat engine. Also, as previously noted, high temperature fuel cells of all types can be used in the system.

What is claimed is:

1. A hybrid fuel cell system comprising:
  a high temperature fuel cell having an anode section and a cathode section;
  a heat engine having a compressor cycle and an expansion cycle, said compressor cycle compressing oxidant supply gas;
  a heat recovery unit for receiving exhaust gas from the cathode section of said fuel cell, fuel and water to produce fuel for the anode section of said fuel cell, said heat recovery unit supplying heat to said compressed oxidant supply gas;
  a heat exchanger for supplying additional heat to said heated compressed oxidant supply gas from an output of an oxidizer, said oxidizer output serving as an oxidant gas input to the cathode section of said fuel cell;

the heated compressed oxidant gas after being further heated in said heat exchanger, being expanded in the expansion cycle of said heat engine to provide an expanded oxidant gas and produce mechanical energy for conversion to electrical energy in a generator;

the oxidizer receiving said expanded oxidant gas and an exhaust gas from the anode section of said fuel cell to develop said output of said oxidizer.

2. A hybrid fuel cell system in accordance with claim 1 wherein:

said heat engine comprises a turbine generator having a compressor section for receiving said oxidant supply gas and performing said compressor cycle and an expansion section for receiving said further heated compressed oxidant gas and performing said expansion cycle.

3. A hybrid fuel cell system in accordance with claim 2 wherein:

said fuel cell is an internally reforming fuel cell.

4. A hybrid fuel cell system in accordance with claim 3 wherein:

said fuel cell is a carbonate fuel cell.

5. A hybrid fuel cell system in accordance with claim 4 wherein:

said fuel is supplied at near ambient pressure.

6. A hybrid fuel cell system in accordance with claim 2, wherein said turbine generator is unfired.

7. A hybrid fuel cell system in accordance with claim 1 wherein:

said fuel cell is one of an externally reforming fuel cell and an internally reforming fuel cell.

8. A hybrid fuel cell system in accordance with claim 6 wherein:

said fuel cell is one of a carbonate fuel cell and a solid oxide fuel cell.

* * * * *

UNITED STATES PATENT AND TRADEMARK OFFICE
CERTIFICATE OF CORRECTION

PATENT NO.   : 6,365,290 B1
DATED        : April 2, 2002
INVENTOR(S)  : Hossein Ghezel-Ayagh et al.

It is certified that error appears in the above-identified patent and that said Letters Patent is hereby corrected as shown below:

<u>Column 6,</u>
Line 14, delete "claim 6" and insert -- claim 7 --.

Signed and Sealed this

Fifth Day of November, 2002

Attest:

Attesting Officer

JAMES E. ROGAN
*Director of the United States Patent and Trademark Office*